(12) United States Patent
Ishii et al.

(10) Patent No.: US 10,069,206 B2
(45) Date of Patent: Sep. 4, 2018

(54) VARIABLE CAPACITANCE DEVICE AND ANTENNA DEVICE

(71) Applicant: TAIYO YUDEN CO., LTD., Tokyo (JP)

(72) Inventors: Daiki Ishii, Tokyo (JP); Kentaro Morito, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 3 days.

(21) Appl. No.: 15/459,745

(22) Filed: Mar. 15, 2017

(65) Prior Publication Data

US 2018/0006377 A1  Jan. 4, 2018

(30) Foreign Application Priority Data

Jun. 29, 2016  (JP) .................................. 2016-129183

(51) Int. Cl.
*H01Q 7/00*     (2006.01)
*H01Q 5/10*     (2015.01)
(Continued)

(52) U.S. Cl.
CPC ................................. *H01Q 9/0442* (2013.01)

(58) Field of Classification Search
CPC ........ H01Q 9/0442; H01Q 7/00; H01Q 7/005; H01Q 5/10; H01Q 1/22; H01L 27/02;
(Continued)

(56) References Cited

U.S. PATENT DOCUMENTS 6,674,321 B1   1/2004  York
7,109,944 B2 *  9/2006  Sato ..................... H01Q 9/0442
                                                     343/745

(Continued)

FOREIGN PATENT DOCUMENTS

JP   H5-167216 A    7/1993
JP   H7-192857 A    7/1995

(Continued)

OTHER PUBLICATIONS

Japanese Office Action dated Apr. 17, 2018, in a counterpart Japanese patent application No. 2016-129183. (A machine translation (not reviewed for accuracy) attached.).

*Primary Examiner* — Tho G Phan
(74) *Attorney, Agent, or Firm* — Chen Yoshimura LLP

(57) ABSTRACT

A variable capacitance device includes: capacitors coupled in series between first and second signal terminal electrodes, each of the capacitors having a dielectric layer, a lower electrode and an upper electrode, a permittivity of the dielectric layer changing according to a voltage applied to the dielectric layer, the lower and upper electrodes sandwiching the dielectric layer; resistance films coupled between the capacitors and a bias terminal electrode; a first insulating film that contacts the resistance films; and a second insulating film that covers the capacitors, the resistance films and the first insulating film, wherein: a thermal conductivity of the first insulating film is larger than that of the second insulating film; and at least one of the resistance films has a pair of connection patterns provided on both ends thereof and resistance patterns that are coupled in parallel between the connection patterns.

8 Claims, 10 Drawing Sheets

(51) Int. Cl.
*H01L 27/02* (2006.01)
*G06K 19/07* (2006.01)
*H01G 7/06* (2006.01)
*H01Q 9/04* (2006.01)

(58) Field of Classification Search
CPC ...... H01L 27/0248; H01G 7/06; G06K 19/07; G06K 19/077
See application file for complete search history.

(56) References Cited

U.S. PATENT DOCUMENTS

| | | | |
|---|---|---|---|
| 7,369,394 B2* | 5/2008 | Kurioka | H01L 27/016 |
| | | | 257/E27.116 |
| 9,047,524 B2* | 6/2015 | Ikemoto | H04B 5/0062 |
| 9,704,847 B2* | 7/2017 | Nakaiso | H01L 27/0248 |
| 9,730,324 B2* | 8/2017 | Ishii | H05K 1/162 |
| 2014/0139968 A1 | 5/2014 | Ikenaga et al. | |
| 2017/0271318 A1* | 9/2017 | Nakaiso | H01L 27/0805 |

FOREIGN PATENT DOCUMENTS

| | | |
|---|---|---|
| JP | H9-306703 A | 11/1997 |
| JP | 2002-8902 A | 1/2002 |
| JP | 2005-508096 A | 3/2005 |
| JP | 2014-103181 A | 6/2014 |
| JP | 2015-73047 A | 4/2015 |
| JP | 2016-81958 A | 5/2016 |

* cited by examiner

VARIABLE CAPACITANCE DEVICE AND ANTENNA DEVICE

CROSS-REFERENCE TO RELATED APPLICATION

This application is based upon and claims the benefit of priority of the prior Japanese Patent Application No. 2016-129183, filed on Jun. 29, 2016, the entire contents of which are incorporated herein by reference.

FIELD

A certain aspect of the present invention relates to a variable capacitance device and an antenna device.

BACKGROUND

In an NFC (Near Field Communication) module or a wireless power supply module, a resonance frequency may fluctuate because of variability of electrical characteristic of a coil used for an antenna or usage circumstance of the modules. In order to adjust the resonance frequency, a variable capacitance device of which capacitance changes according to a bias voltage is used. For example, there is known a variable capacitance device in which a plurality of capacitors of which capacitance changes according to an applied voltage are coupled between signal terminals in series and are coupled in parallel between bias terminals (see Japanese Patent Application Publication No. 2005-508096). And, there is disclosed a capacitance change ratio can be largely changed by adjusting a resistance of a plurality of resistances coupled between a capacitor and a bias terminal in such a variable capacitance device (see Japanese Patent Application Publication No. 2014-103181).

There is known a resistance heater having a resistance heater provided in ladder shape between electrodes for the purpose of uniform heating (see Japanese Patent Application Publication No. H7-192857). There is known a resistor having a first ladder resistance path in parallel with a main resistance path and a second ladder resistance path vertical to the main resistance path and can adjust a resistance thereof with high accuracy (see Japanese Patent Application Publication No. H9-306703).

SUMMARY OF THE INVENTION

According to an aspect of the present invention, there is provided a variable capacitance device including: a support substrate; a plurality of capacitors that are provided on the support substrate and are coupled in series between a first signal terminal electrode and a second signal terminal electrode, each of the plurality of capacitors having a dielectric layer, a lower electrode and an upper electrode, a permittivity of the dielectric layer changing according to a voltage applied to the dielectric layer, the lower electrode and the upper electrode sandwiching the dielectric layer; a plurality of resistance films that are provided on the support substrate and are coupled between the plurality of capacitors and a bias terminal electrode; a first insulating film that is provided on the support substrate and contacts the plurality of resistance films; and a second insulating film that is provided on the support substrate and covers the plurality of capacitors, the plurality of resistance films and the first insulating film, wherein: a thermal conductivity of the first insulating film is larger than that of the second insulating film; and at least one of the plurality of resistance films has a pair of connection patterns provided on both ends thereof and a plurality of resistance patterns that are coupled in parallel between the pair of connection patterns.

According to another aspect of the present invention, there is provided an antenna device including a variable capacitance device described above.

DETAILED DESCRIPTION

Recently, a communication device is downsized. Therefore, variable capacitance devices are being downsized. Therefore, downsizing of a resistor coupled between a capacitor and a bias terminal electrode is demanded in the variable capacitance devices. It is possible to downsize the resistor by using a high resistance material as a resistance film or reducing a thickness of the resistance film. However, in this case, when an alternate signal having large amplitude (large voltage) is input into a signal terminal electrode, the voltage is applied to a resistance film. Therefore, there may be a case where the resistance film is broken by heating.

A description will be given of an embodiment with reference to the accompanying drawings.

Embodiment

Figure 1:
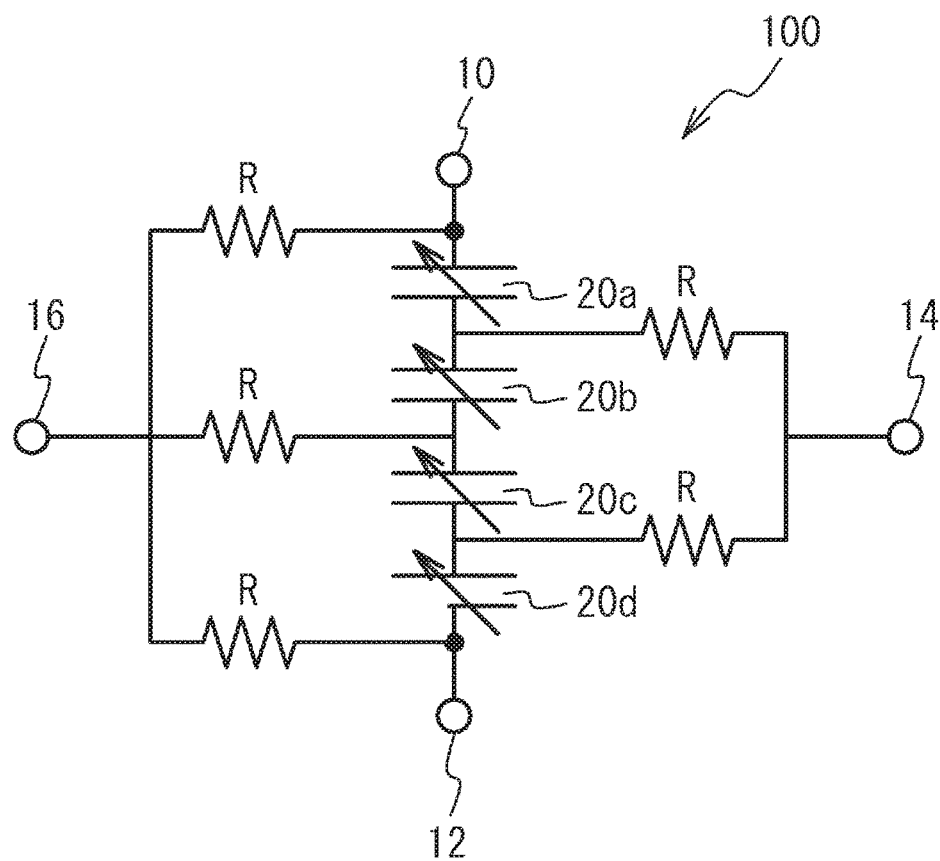
FIG. 1 illustrates a circuit diagram of a variable capacitance in accordance with a first embodiment.

FIG. 1 illustrates a circuit diagram of a variable capacitance device 100 in accordance with a first embodiment. As illustrated in FIG. 1, in the variable capacitance device 100 of the first embodiment, a plurality of capacitors 20a to 20d are coupled in series between a first signal terminal 10 and a second signal terminal 12. The first signal terminal 10 receives an alternating current signal of high frequency. The second signal terminal 12 outputs the alternating current signal. A frequency of the alternating signal is equal to 100 kHz or more. The frequency is, for example, 13.56 MHz. However, the frequency is not limited to the value.

The plurality of capacitors 20a to 20d are coupled in parallel between a first bias terminal 14 and a second bias terminal 16. One end of the plurality of capacitors 20a to 20d is coupled to the first bias terminal 14 via resistors R. The other end of the plurality of capacitor 20a to 20d is coupled to the second bias terminal 16 via resistors R. A direct current bias voltage is applied to the first bias terminal 14. The second bias terminal 16 is coupled to a ground. Capacitances of the plurality of capacitors 20a to 20d change in accordance with the bias voltage applied between the first bias terminal 14 and the second bias terminal 16.

Figure 2:
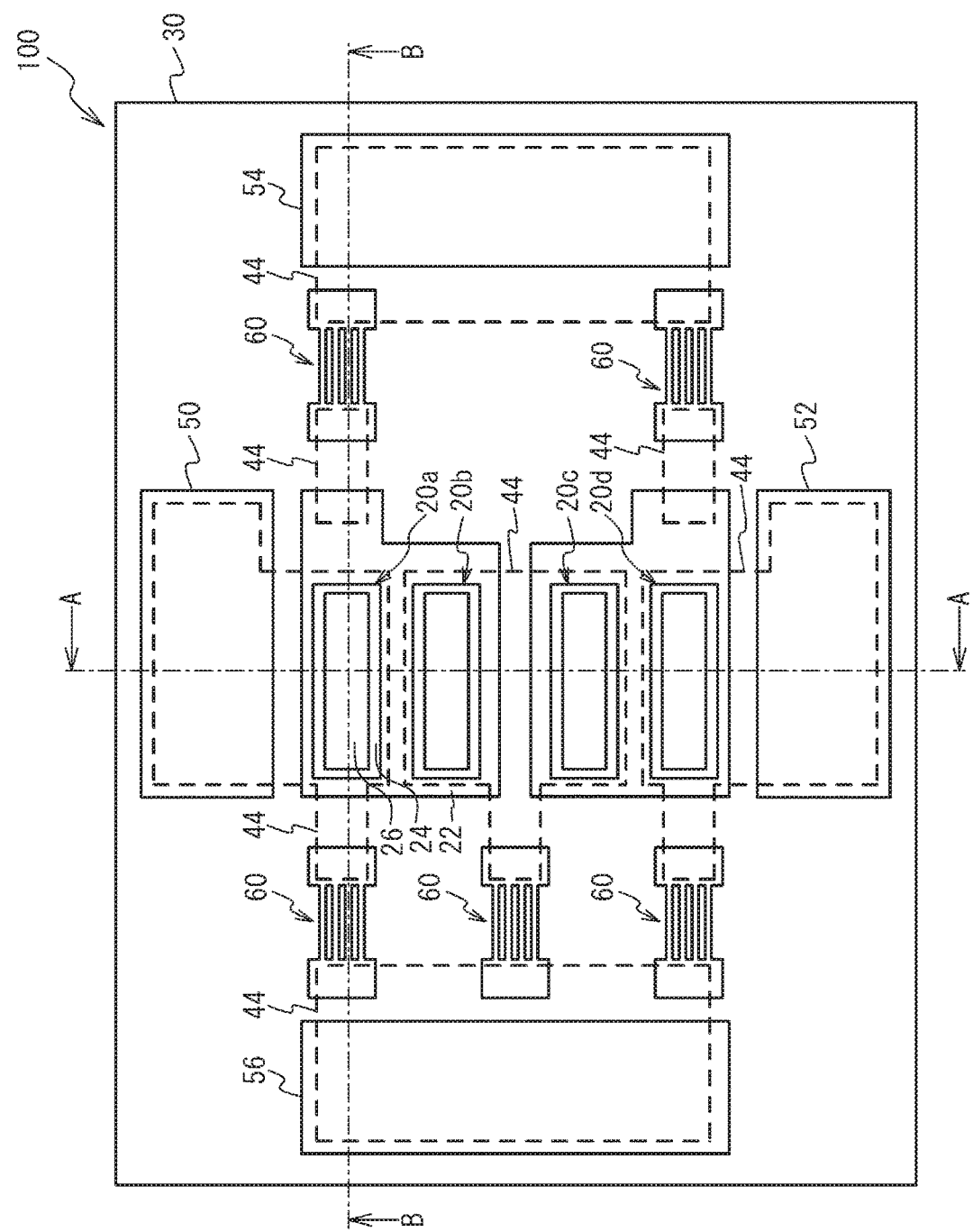
FIG. 2 illustrates a plan view of a variable capacitance in accordance with a first embodiment.
Figure 3A:
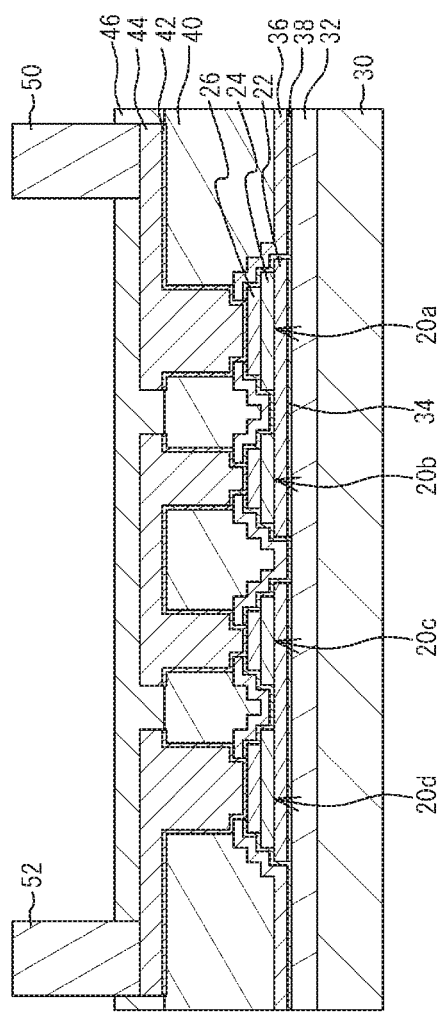
FIG. 3A illustrates a cross sectional view taken along an A-A line of FIG. 2.
Figure 3B:
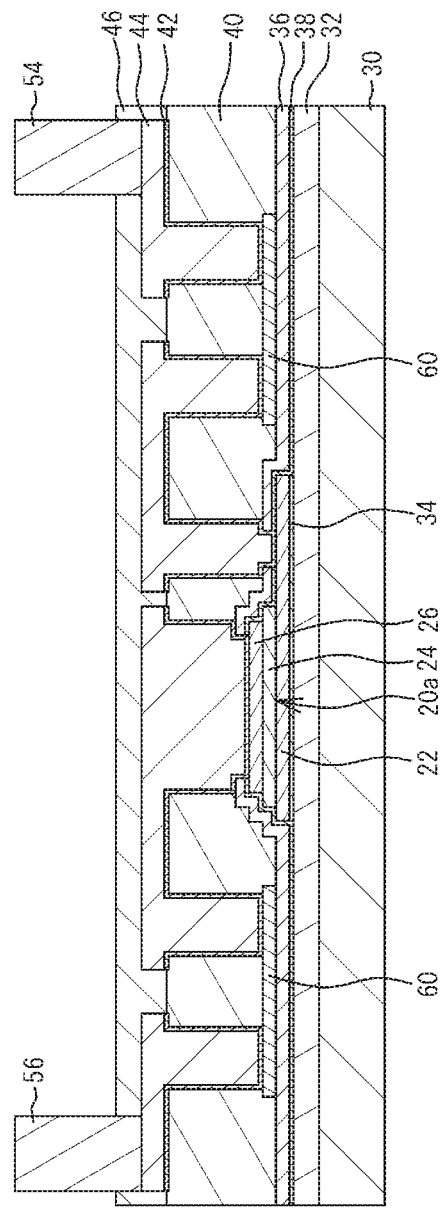
FIG. 3B illustrates a cross sectional view taken along a B-B line of FIG. 2.

FIG. 2 illustrates a plan view of the variable capacitance device in accordance with the first embodiment. FIG. 3A illustrates a cross sectional view taken along an A-A line of FIG. 2. FIG. 3B illustrates a cross sectional view taken along a B-B line of FIG. 2. As illustrated in FIG. 2 to FIG. 3B, the plurality of capacitors 20a to 20d are formed on a support substrate 30 having an upper face on which an insulating film 32 is provided. For example, the support substrate 30 is a silicon (Si) substrate having a thickness of 200 μm. For example, the insulating film 32 is a silicon oxide ($SiO_2$) film having a thickness of 1 μm. For example, the support substrate 30 may be an insulating substrate such as a silica substrate, an aluminum oxide ($Al_2O_3$) substrate, a sapphire substrate or a glass substrate. As illustrated, the support substrate 30 may be a conductive substrate such as Si. It is preferable that a high-resistance substrate is used as the support substrate 30. When the insulating substrate is used, the insulating film 32 on the upper face may be omitted.

The plurality of capacitors 20a to 20d have a lower electrode 22 provided on the insulating film 32 through an adherence layer 34, a dielectric layer 24 provided on the lower electrode 22, and an upper electrode 26 provided on the dielectric layer 24. The adherence layer 34 is, for example, a titanium (Ti) layer or a titanium oxide ($TiO_x$) layer. The plurality of capacitors 20a to 20d may lack the adherence layer 34. The lower electrode 22 of the capacitor 20a is connected with the lower electrode 22 of the capacitor 20b. Thereby, the capacitors 20a and the capacitors 20b are integrally connected with each other. Similarly, the lower electrode 22 of the capacitor 20c is connected with the lower electrode 22 of the capacitor 20d. Thereby, the capacitors 20c and the capacitors 20d are integrally connected with each other. The lower electrodes 22 may be separated from each other. In this case, the lower electrode 22 of the capacitor 20a may be electrically coupled to the lower electrode 22 of the capacitor 20b by a wiring or the like, and the lower electrode 22 of the capacitor 20c may be electrically coupled to the lower electrode 22 of the capacitor 20d by a wiring or the like.

For example, the lower electrode 22 and the upper electrode 26 are platinum (Pt) having a thickness of 250 nm. The lower electrode 22 and the upper electrode 26 may be a noble metal such as iridium (Ir) or ruthenium (Ru) or a conductive oxide such as strontium ruthenate ($SrRuO_3$), ruthenium oxide ($RuO_2$), or iridium oxide ($IrO_2$).

The dielectric layer 24 is a BST ($BaSrTiO_3$) layer, to which manganese (Mn) is doped, having a thickness of 90 nm. Another additive agent may be doped to the BST. For example, niobium (Nb) may be doped in order to improve leak characteristic. Another micro amount additive agent may be doped in order to improve another characteristic such as pressure resistance characteristic. A composition ratio of Ba to Sr is, for example, 0.5 to 0.5. The composition ratio may be another value. The dielectric layer 24 has variable capacitance characteristic. A dielectric constant of the dielectric layer 24 changes when a bias voltage is applied to the dielectric layer 24. The dielectric layer 24 may be a perovskite oxide such as BST ($BaSrTiO_3$), $PbTiO_3$ or PZT ($PbZrTiO_3$).

An insulating film 36 covers the plurality of capacitors 20a to 20d and has an opening on the upper electrode 26 and the lower electrode 22. The insulating film 36 is provided through an adherence layer 38 such as titanium oxide ($TiO_x$). The insulating film 36 may be provided without the adherence layer 38. The insulating film 36 contacts the lower electrode 22, the dielectric layer 24 and the upper electrode 26 of the plurality of capacitors 20a to 20d. The insulating film 36 is, for example, an aluminum oxide ($Al_2O_3$) film having a thickness of 100 nm. The insulating film 36 may be a film having a thermal conductivity higher than that of an insulating film 40 descried later.

A plurality of resistance films 60 are provided on the insulating film 36. The plurality of resistance film 60 contacts an upper face of the insulating film 36. The resistance film 60 forms the resistor R of FIG. 1. The resistance film 60 is, for example, a TaSiN film having a thickness of 75 nm and a resistivity of 1.3 Ω·cm. The resistance film 60 may be a high resistance film such as Ni—Cu alloy or Fe—Cr—Al alloy. In order to downsize the resistance film 60, it is preferable that the resistance film 60 is made of a material having a resistivity of 0.1 Ω·cm or more.

The insulating film 40 covers the plurality of capacitors 20a to 20d, the plurality of resistance films 60 and the insulating film 36. The insulating film 40 has an opening on the upper electrode 26 and the lower electrode 22 and has an opening on the resistance film 60. The openings of the insulating film 40 are filled with an intersection layer 44. The intersection layer 44 extends on the insulating film 40. The intersection layer 44 is provided through a seed layer 42. However, the intersection layer 44 may be provided without the seed layer 42. For example, the seed layer 42 is a lamination film of tantalum nitride (TaN), tantalum (Ta) and Cu. The intersection layer 44 is, for example, a cupper (Cu)-plated film having a thickness of 4 μm. The seed layer 42 may be other than the lamination film of TaN, Ta and Cu. A nitride such as titanium nitride (TiN), titanium silicon nitride (TiSiN), tantalum silicon nitride (TaSiN) or oxide such as SrRuO3 or IrO2 may be used as the seed layer 42 instead of TaN. The intersection layer 44 may be a conductive material such as aluminum (Al) or aluminum alloy (AlSi, AlCu or the like).

The upper electrode 26 of the capacitor 20a is coupled to a first signal terminal electrode 50 via the intersection layer 44. The upper electrode 26 of the capacitor 20d is coupled to a second signal terminal electrode 52 via the intersection layer 44. The upper electrode 26 of the capacitor 20b is coupled to the upper electrode 26 of the capacitor 20c via the intersection layer 44. Thus, the plurality of capacitors 20a to 20d are coupled in series between the first signal terminal electrode 50 and the second signal terminal electrode 52 via the intersection layer 44. The first signal terminal electrode 50 corresponds to the first signal terminal 10 of FIG. 1. The second signal terminal electrode 52 corresponds to the second signal terminal 12 of FIG. 1.

The lower electrode 22 common to the capacitor 20a and the capacitor 20b and the lower electrode 22 common to the capacitor 20c and the capacitor 20d are coupled to the resistance film 60 via the intersection layer 44. The resistance film 60 coupled to the lower electrode 22 is coupled to a first bias terminal electrode 54 via the intersection layer 44. The upper electrode 26 of the capacitors 20a to 20d is coupled to the resistance film 60 via the intersection layer 44. The resistance film 60 coupled to the upper electrode 26 is coupled to a second bias terminal electrode 56 via the intersection layer 44. Thus, the plurality of capacitors 20a to 20d are coupled in parallel between the first bias terminal electrode 54 and the second bias terminal electrode 56 via the intersection layer 44. The first bias terminal electrode 54 corresponds to the first bias terminal 14 of FIG. 1. The second bias terminal electrode 56 corresponds to the second bias terminal 16 of FIG. 1.

An insulating film 46 is provided on the insulating film 40 and the intersection layer 44 and exposes the first signal terminal electrode 50, the second signal terminal electrode 52, the first bias terminal electrode 54 and the second bias terminal electrode 56. The insulating films 40 and 46 act as a protective film. For example, the insulating films 40 and 46 are a polyimide film having a thickness of 3 μm. The first signal terminal electrode 50, the second signal terminal electrode 52, the first bias terminal electrode 54 and the second bias terminal electrode 56 are a lamination film having a thickness of 10 μm in which Cu, Ni and tin (Sn) are laminated in this order. The first signal terminal electrode 50, the second signal terminal electrode 52, the first bias terminal electrode 54 and the second bias terminal electrode 56 may be gold (Au) or solder.

As described above, the thermal conductivity of the insulating film 36 is higher than that of the insulating film 40. The insulating film 36 covers the plurality of capacitors 20a to 20d and contacts the resistance film 60. Therefore, a heat release characteristic of the heat generated by the plurality of capacitors 20a to 20d and the resistance film 60 is improved. In order to improve the heat release characteristic, it is preferable that the thermal conductivity of the insulating film 36 is higher than that of the insulating film 40 by one order or more, and it is preferable that the thickness of the insulating film 36 is 100 nm or more. The insulating film 36 covers the plurality of capacitors 20a to 20d. It is therefore possible to improve the humidity resistance of the plurality of capacitors 20a to 20d.

Other than the polyimide (PI) resin, the insulating film 40 may be a resin film such as polystyrene (PS) resin, high-density polyethylene (HDPE) resin, polyoxymethylene (POM) resin, polycarbonate (PC) resin, epoxy resin, polyvinylidene fluoride (PVDF) resin, phenolic resin, polytetrafluoroethylene (PTFE) resin or polybenzoxazole (PBO) resin, or an inorganic insulating film such as silicon oxide (SiO$_2$) film or a zirconium oxide film (ZrO$_2$). When the above-mentioned film is used as the insulating film 40, the insulating film 36 having a thermal conductivity higher than that of the insulating film 40 may be a silicon nitride (SiN) film, a strontium titanate (SrTiO$_3$) film, or an aluminum nitride (AlN) film other than the aluminum oxide (Al$_2$O$_3$) film. The thermal conductivity is shown in Table 1.

TABLE 1

| MATERIAL | PI | PS | HDPE | POM | PC | Epoxy |
|---|---|---|---|---|---|---|
| THERMAL CONDUCTIVITY [W/m · k] | 0.18 | 0.18 | 0.48 | 0.23 | 0.20 | 0.19 |
| MATERIAL | PVDF | Phenolic | PTFE | PBO | SiO$_2$ | ZrO$_2$ |
| THERMAL CONDUCTIVITY [W/m · k] | 0.11 | 0.15 | 0.25 | 0.41 | 1.38 | 3~4 |
| MATERIAL | Al$_2$O$_3$ | SiN | SrTiO$_3$ | AlN | | |
| THERMAL CONDUCTIVITY [W/m · k] | 32 | 20~28 | 11.2 | 150~160 | | |

Figure 4:
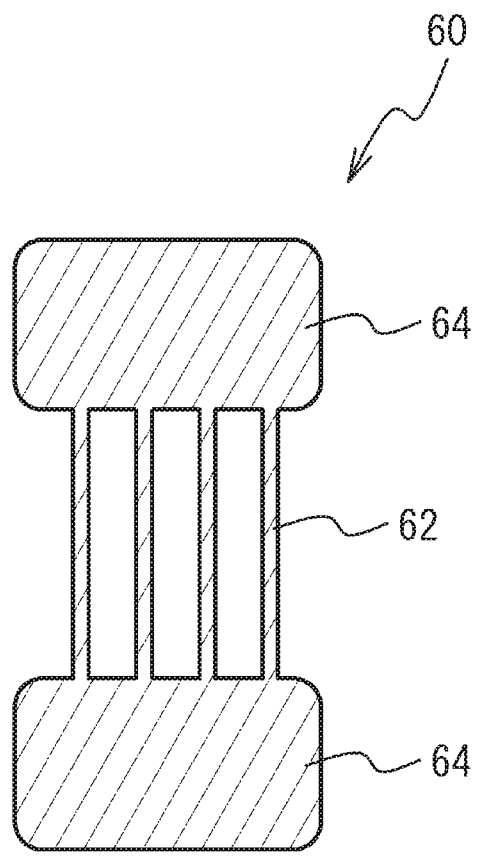
FIG. 4 illustrates an enlarged plan view of a resistance film of FIG. 2.

FIG. 4 illustrates an enlarged plan view of the resistance film of FIG. 2. As illustrated in FIG. 4, the resistance film 60 has a pair of connection patterns 64 on the both edges thereof and a plurality of resistance patterns 62 coupled in parallel between the pair of connection patterns 64. The pair of connection patterns 64 and the plurality of resistance patterns 62 are formed in the same process. Therefore, the pair of connection patterns 64 and the plurality of resistance patterns 62 are made of the same material (for example, TaSiN film described above). The material of the pair of connection patterns 64 may be different from that of the plurality of resistance patterns 62. A current flows between the pair of connection patterns 64. Therefore, the plurality of resistance patterns 62 extend in a direction along the current flow and are coupled in parallel.

A description will be given of experiments performed by the present inventors. The present inventors used an Al$_2$O$_3$ film having a relatively higher thermal conductivity and a SiO$_2$ film having a relatively lower thermal conductivity and made a plurality of samples in which two resistance films 60 are provided. Each of the two resistance films 60 is provided on the Al$_2$O$_3$ film and the SiO$_2$ film and has different number of resistance patterns 62 between the pair of connection patterns 64. The resistance films 60 are covered by a polyimide film. And the present inventors estimated resistance to electrical power of each sample. The resistance film 60 on the Al$_2$O$_3$ film is made of TaSiN or TaN. The resistance film 60 on the SiO$_2$ film is made of TaSiN. Table 2 shows data of the resistance film of each sample. As shown in Table 2, the resistance value that is changeable according to the number of the resistance pattern 62 is corrected by adjusting a length of the resistance pattern 62. The resistance value of each resistance film is 0.5 MΩ.

TABLE 2

| RESISTANCE VALUE [MΩ] | 0.5 | 0.5 | 0.5 | 0.5 | 0.5 | 0.5 |
|---|---|---|---|---|---|---|
| NUMBER OF RESISTANCE PATTERN | 1 | 2 | 4 | 5 | 6 | 8 |
| LENGTH OF RESISTANCE PATTERN [μm] | 30 | 60 | 120 | 150 | 180 | 240 |
| WIDTH OF RESISTANCE PATTERN [μm] | 10 | 10 | 10 | 10 | 10 | 10 |
| THICKNESS OF RESISTANCE PATTERN [nm] | 100 | 100 | 100 | 100 | 100 | 100 |

Figure 5:
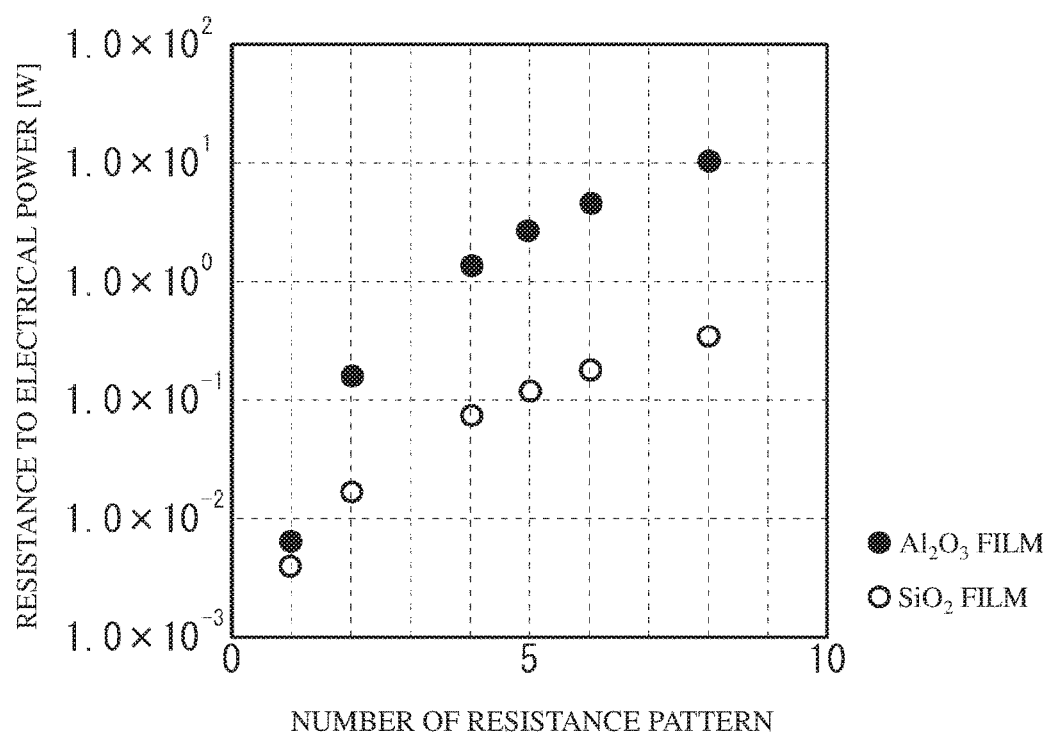
FIG. 5 illustrates measured results of resistance to electrical power of a resistance film.

FIG. 5 illustrates measured results of the resistance to electrical power of the resistance film. A horizontal axis of FIG. 5 indicates the number of resistance patterns. A vertical axis of FIG. 5 indicates the resistance to electrical power (W). Black circles of FIG. 5 indicate the measured results in a case where the Al$_2$O$_3$ film was used. White circles of FIG. 5 indicate the measured results in a case where the SiO$_2$ film was used. As illustrated in FIG. 5, when the resistance film 60 is provided on the Al$_2$O$_3$ film having a relatively higher thermal conductivity, the resistance to electrical power is improved compared to a case where the resistance film 60 is provided on the SiO$_2$ film having a relatively lower thermal conductivity.

This is because the heat release characteristic from the resistance pattern 62 is improved by using the Al$_2$O$_3$ film having a relatively higher thermal conductivity. When the number of resistance pattern 62 is increased, the resistance to electrical power is improved. This is because the heat generation amount per a single resistance pattern 62 decreases as the number of the resistance patterns 62 coupled in parallel increases, and the heat release characteristic is improved. From the results, when the resistance film 60 having the plurality of resistance patterns 62 coupled in parallel between the pair of connection patterns 64 is provided on a film having a high thermal conductivity, the resistance to electrical power of the resistance film 60 is improved. In order to improve the resistance to electrical power, it is preferable that the number of the resistance patterns 62 is four or more.

In the first embodiment, as illustrated in FIG. 3B and FIG. 4, the resistance film 60 contacts the insulating film 36 having (relatively high thermal conductivity) the thermal conductivity higher than that of the insulating film 40. The resistance film 60 has the plurality of resistance patterns 62 coupled in parallel between the pair of connection patterns 64 positioned at the both edges thereof. It is therefore possible to improve the resistance to electrical power, as illustrated in FIG. 5. The size reduction of the resistance film 60 is difficult because the resistance to electrical power is needed. However, when the resistance to electrical power of the resistance film 60 is improved, the size of the resistance film 60 can be reduced. It is therefore possible to reduce the size of the variable capacitance device 100.

From a view point of the heat release characteristic, it is preferable that the resistance film 60 is thin. However, when the resistance film 60 is thin, a problem of the resistance value variability through the manufacturing processes may occur. For example, when a manufacturing error of plus-minus 2 nm occurs, the variability is plus-minus 2% in a case where a target thickness is 100 nm. However, the variability is plus-minus 20% in a case where the target thickness is 10 nm. In this manner, when the resistance film 60 becomes thinner, the variability control in the manufacturing process becomes difficult. When the resistance film 60 becomes thicker, a forming time becomes longer, many materials are used, and the manufacturing cost increases. Therefore, in view of these conditions, it is preferable that the thickness of the resistance film 60 is 10 nm or more and 300 nm or less. It is more preferable that the thickness of the resistance film 60 is 20 nm or more and 200 nm or less. It is still more preferable that the thickness of the resistance film 60 is 50 nm or more and 100 nm or less.

In FIG. 3B, the insulating film 36 having a relatively higher thermal conductivity contacts the lower face of the resistance film 60. However, the insulating film 36 may contact the upper face of the resistance film 60. The insulating film 36 may contact the upper face and the lower face of the resistance film 60. As described above, the resistance film 60 is thin. Therefore, from a view point of the heat release characteristic, the insulating film 36 may contact at least one of the upper face and the lower face of the resistance film 60. When the insulating film 36 contacts only one of the upper face and the lower face of the resistance film 60, it is possible to form the insulating film 36 that contacts the resistance film 60 and covers the plurality of capacitors 20a to 20d, in a single forming process. Therefore, the manufacturing cost can be reduced.

In the first embodiment, all of the plurality of resistance films 60 have the plurality of resistance patterns 62. However, at least one of the plurality of resistance films 60 has the plurality of resistance pattern 62.

Figure 6A:
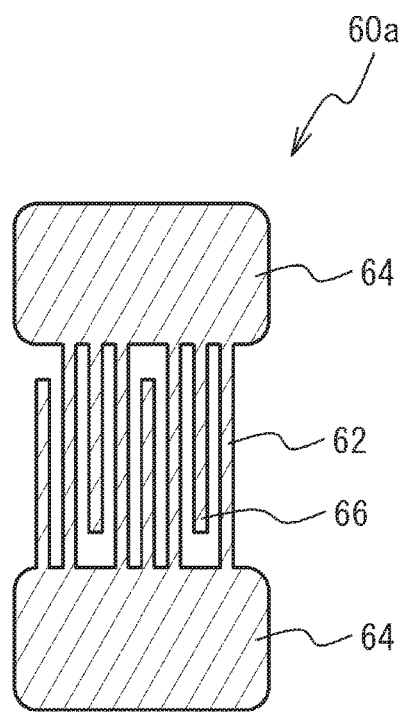
FIG. 6A and FIG. 6B illustrate a plan view of another resistance film.
Figure 6B:
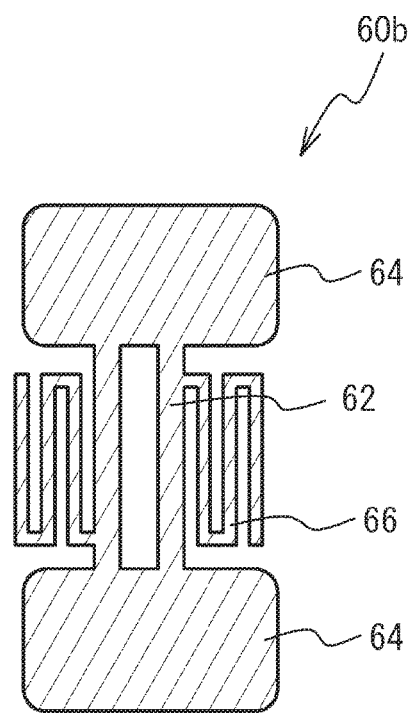

In the first embodiment, the resistance film 60 has the plurality of resistance patterns 62 and the pair of connection patterns 64. However, the structure is not limited. FIG. 6A and FIG. 6B illustrate a plan view of another resistance film. As illustrated in FIG. 6A, a resistance film 60a has a dummy pattern 66. A first end of the dummy pattern 66 is coupled to one of the pair of connection patterns 64. A second end of the dummy pattern 66 is coupled to none of the plurality of resistance patterns 62 and the pair of connection patterns 64. As illustrated in FIG. 6B, a resistance film 60b has another dummy pattern 66. A first end of the dummy pattern 66 is coupled to one of the plurality of resistance patterns 62. A second end of the dummy pattern 66 is coupled to none of the plurality of resistance patterns 62 and the pair of connection patterns 64. The dummy pattern 66 is made of the same material as the plurality of resistance patterns 62 and the pair of connection patterns 64, because the dummy pattern 66 is formed in the same process of the plurality of resistance patterns 62 and the pair of connection patterns 64. However, the dummy pattern 66 may be made of a material different from that of the plurality of resistance patterns 62 and the pair of connection patterns 64. The second end of the dummy pattern 66 is in an open phase and is coupled to none of the conductors. Therefore, the dummy pattern 66 does not influence on the resistance value.

When the dummy pattern 66 of FIG. 6A and FIG. 6B is provided, the heat release characteristic of the resistance films 60a and 60b is further improved. It is therefore possible to improve the resistance to electrical power.

Second Embodiment

Figure 7:
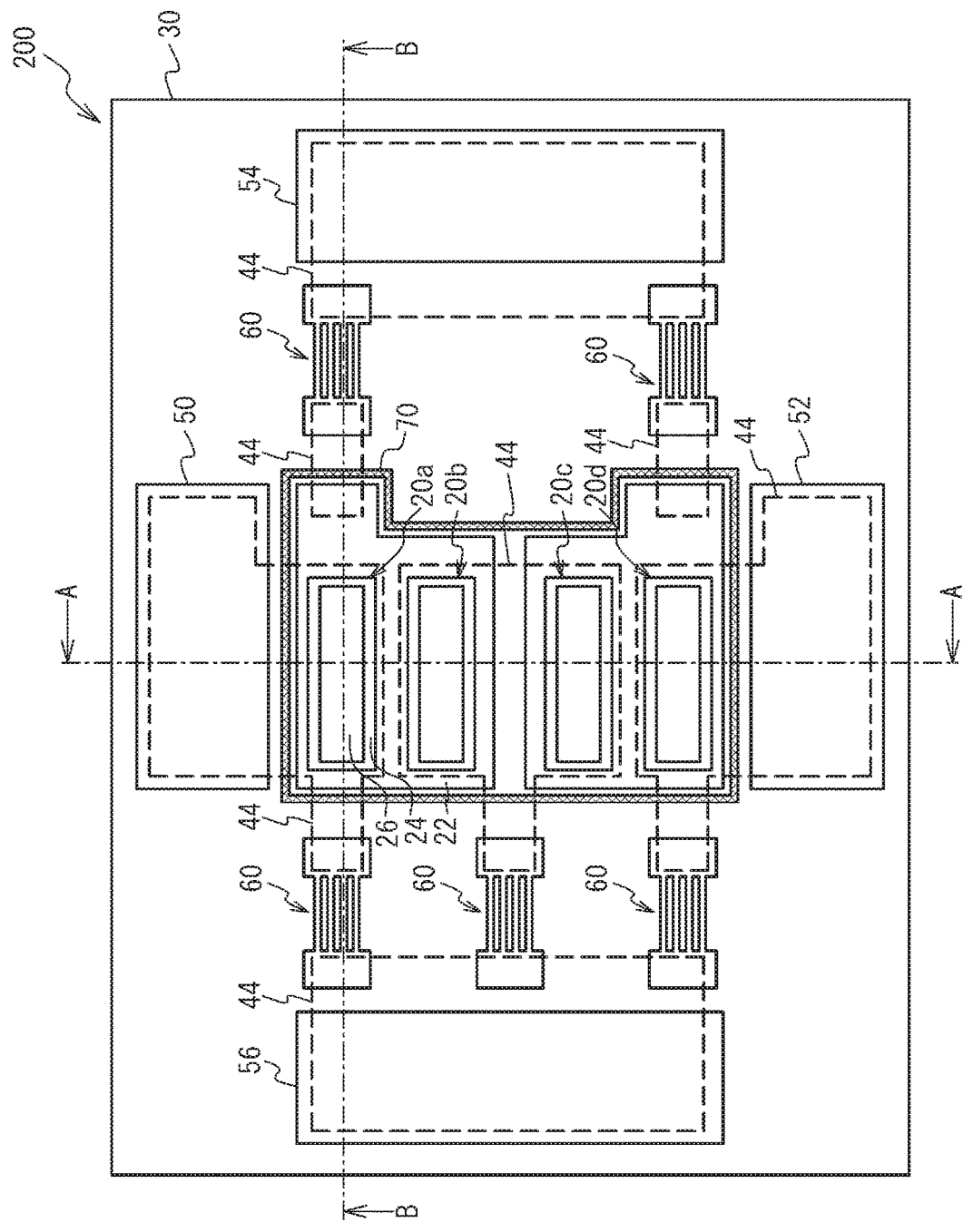
FIG. 7 illustrates a plan view of a variable capacitance device in accordance with a second embodiment.
Figure 8A:
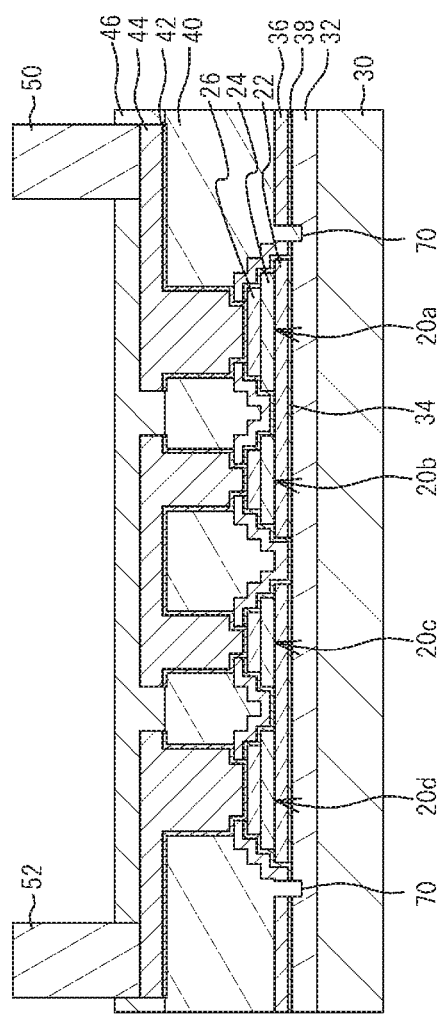
FIG. 8A illustrates a cross sectional view taken along a line A-A of FIG. 7.
Figure 8B:
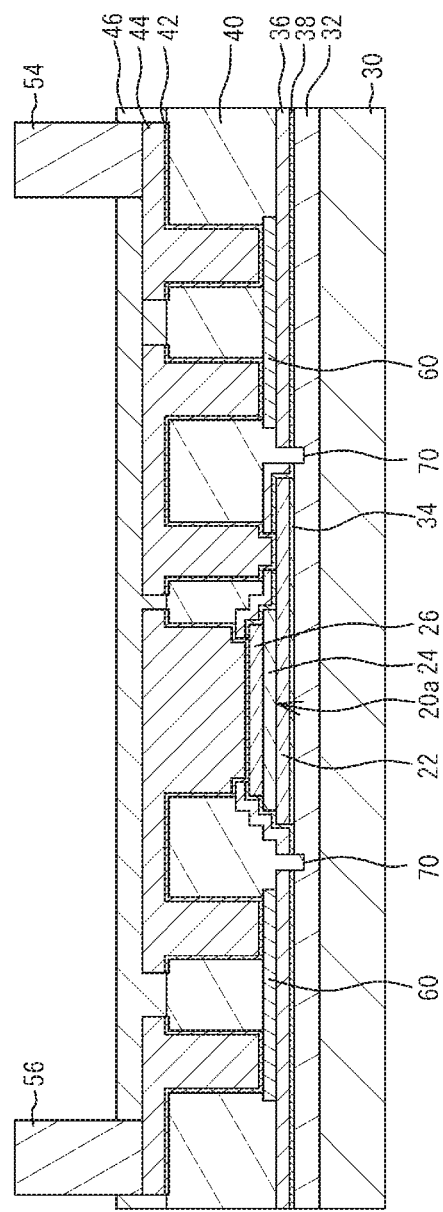
FIG. 8B illustrates a cross sectional view taken along a line B-B of FIG. 7.

FIG. 7 illustrates a plan view of a variable capacitance device in accordance with a second embodiment. FIG. 8A illustrates a cross sectional view taken along a line A-A of FIG. 7. FIG. 8B illustrates a cross sectional view taken along a line B-B of FIG. 7. As illustrated in FIG. 7 to FIG. 8B, in a variable capacitance device 200 of the second embodiment, a groove 70 is formed in the insulating film 36 and surrounds the plurality of capacitors 20a to 20d. The groove 70 penetrates the insulating film 36. It is possible to form the groove 70 by performing a plasma etching process to the insulating film 36. The groove 70 is filled with the insulating film 40. Other structures are the same as the first embodiment. Therefore, an explanation of the other structures is omitted.

In the second embodiment, the groove 70 is formed in the insulating film 36 that covers the plurality of capacitors 20a to 20d and contacts the resistance film 60. The groove 70 surrounds the plurality of capacitors 20a to 20d. The thermal conductivity of the insulating film 36 is relatively high. However, when the groove 70 is formed in the insulating film 36, it is possible to suppress the conductance of the heat generated in the resistance film 60 during the operation of the variable capacitance device 200 to the plurality of capacitors 20a to 20d. The temperature characteristic of the dielectric layer 24 used in the plurality of capacitors 20a to 20d is not good. Therefore, when the heat generated in the resistance film 60 is conducted to the plurality of capacitors 20a to 20d and the temperature of the plurality of capacitor 20a to 20d changes, the capacitance of the plurality of capacitors 20a to 20d may differ from a desirable capacitance. However, in the second embodiment, when the groove 70 is formed in the insulating film 36, the conductance of the heat generated in the resistance film 60 to the plurality of capacitors 20a to 20d is suppressed. It is therefore possible to reduce temperature changing of the plurality of capacitors 20a to 20d. And it is possible to reduce the difference between the capacitance of the plurality of capacitors 20a to 20d and the desirable value. And, the conductance of the heat from the resistance film 60 to the plurality of capacitors 20a to 20d is suppressed. It is therefore possible to locate the resistance film 60 near the plurality of capacitors 20a to 20d. Accordingly, it is possible to downsize the variable capacitance device.

In the second embodiment, the groove 70 formed in the insulating film 36 is filled with the insulating film 40. The thermal conductivity of the insulating film 40 is relatively small. Therefore, when the groove 70 is filled with the insulating film 40, the conduction of the heat generated by the resistance film 60 to the plurality of capacitors 20a to 20d can be suppressed.

Figure 9:
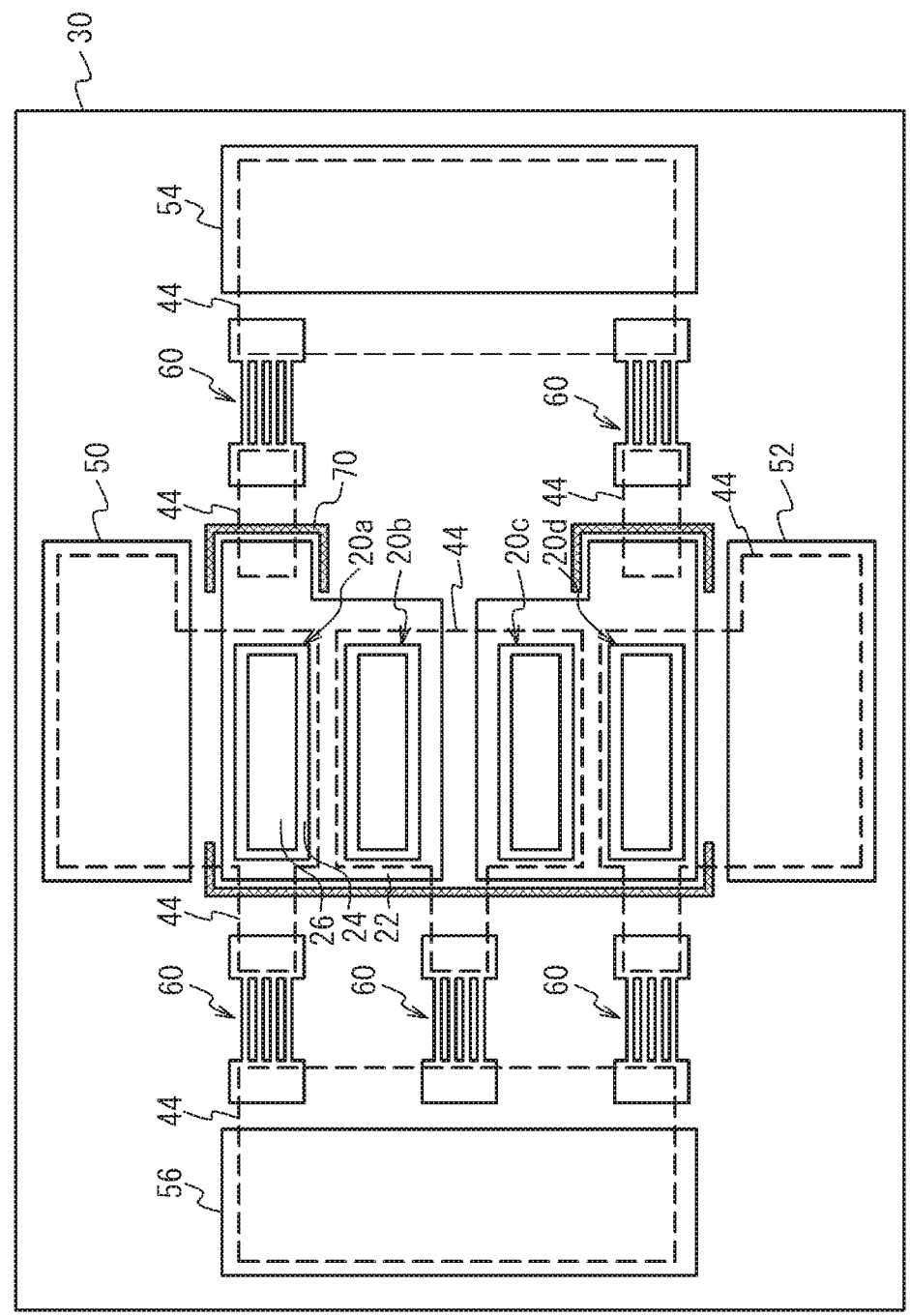
FIG. 9 illustrates a variable capacitance device in accordance with a first modified embodiment of a second embodiment.

In the second embodiment, the groove 70 of the insulating film 36 surrounds the plurality of capacitors 20a to 20d. However, the groove 70 may surround a part of the plurality of capacitors 20a to 20d. FIG. 9 illustrates a plan view of a variable capacitance device in accordance with a first modified embodiment of the second embodiment. As illustrated in FIG. 9, the groove 70 of the insulating film 36 is separated. When the groove 70 is formed between the plurality of capacitors 20a to 20d and the plurality of resistance film 60, the conductance of the heat generated by the resistance film 60 to the plurality of capacitors 20a to 20d can be suppressed.

In the second embodiment, the groove 70 of the insulating film 36 surrounds the plurality of capacitors 20a to 20d. However, the structure is not limited. The groove 70 may surround one, two or more of the plurality of capacitors 20a to 20d. It is preferable that the groove 70 of the insulating film 36 does not surround the resistance film 60. This is because large heat is generated by the resistance film 60 during an operation of the variable capacitance device 200, and the heat generated by the resistance film 60 is released to the insulating film 36 having a larger volume.

In the first embodiment and the second embodiment, the variable capacitance devices have the four capacitors 20a to 20d. However, the number of capacitor may be two, six or more.

Third Embodiment

Figure 10:
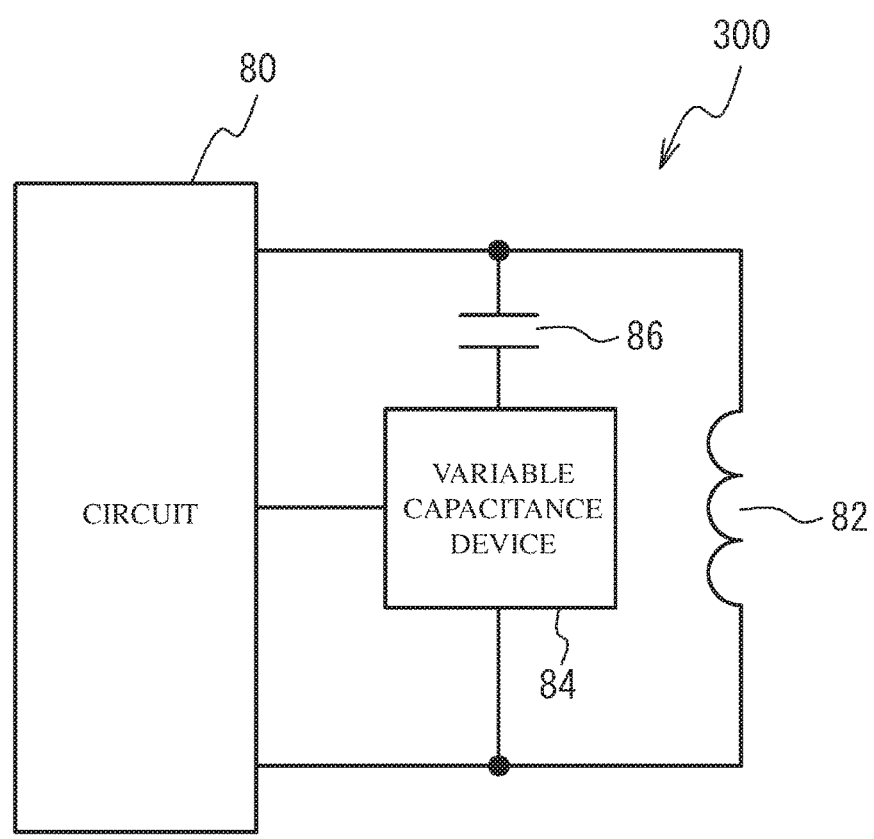
FIG. 10 illustrates an antenna device in accordance with a third embodiment.

FIG. 10 illustrates an antenna device in accordance with a third embodiment. As illustrated in FIG. 10, an antenna device 300 in accordance with the third embodiment has a circuit 80, an antenna coil 82 coupled in parallel with the circuit 80, a variable capacitance device 84, and a capacitor 86 for removing a direct current. The circuit 80 performs a process against a signal received by the antenna coil 82. The circuit 80 controls supply of the direct bias voltage to the variable capacitance device 84. The variable capacitance device 84 may be the variable capacitance device of the first embodiment or the second embodiment.

Although the embodiments of the present invention have been described in detail, it is to be understood that the various change, substitutions, and alterations could be made hereto without departing from the spirit and scope of the invention.

What is claimed is:

1. A variable capacitance device comprising:
    a support substrate;
    a plurality of capacitors that are provided on the support substrate and are coupled in series between a first signal terminal electrode and a second signal terminal electrode, each of the plurality of capacitors having a dielectric layer, a lower electrode and an upper electrode, a permittivity of the dielectric layer changing according to a voltage applied to the dielectric layer, the lower electrode and the upper electrode sandwiching the dielectric layer;
    a plurality of resistance films that are provided on the support substrate and are coupled between the plurality of capacitors and a bias terminal electrode;
    a first insulating film that is provided on the support substrate and contacts the plurality of resistance films; and
    a second insulating film that is provided on the support substrate and covers the plurality of capacitors, the plurality of resistance films and the first insulating film,
    wherein:
    a thermal conductivity of the first insulating film is larger than that of the second insulating film; and
    at least one of the plurality of resistance films has a pair of connection patterns provided on both ends thereof and a plurality of resistance patterns that are coupled in parallel between the pair of connection patterns.

2. The variable capacitance device as claimed in claim 1, wherein the first insulating film contacts the plurality of resistance films, covers the plurality of capacitors, and has a groove between the plurality of capacitors and the plurality of resistance films.

3. The variable capacitance device as claimed in claim 2, wherein the groove of the first insulating film surrounds the plurality of capacitors.

4. The variable capacitance device as claimed in claim 2, wherein the groove of the first insulating film is filled with the second insulating film.

5. The variable capacitance device as claimed in claim 1, wherein at least one of the plurality of resistance films has a dummy pattern, a first end of the dummy pattern being coupled to one of the pair of connection patterns, a second end of the dummy pattern being coupled to none of the plurality of resistance patterns and the pair of connection patterns.

6. The variable capacitance device as claimed in claim 1, wherein at least one of the resistance films has a dummy pattern, a first end of the dummy pattern being coupled to one of the plurality of resistance patterns, a second end of the dummy pattern being coupled to none of the plurality of resistance patterns and the pair of the connection patterns.

7. The variable capacitance device as claimed in claim 1, wherein:
    the first insulating film is an aluminum oxide film, a silicon nitride film, a strontium titanate film or an aluminum nitride film; and
    the second insulating film is a resin film, a silicon oxide film or a zirconium oxide film.

8. An antenna device comprising a variable capacitance device as claimed in claim 1.

* * * * *